No. 650,878. Patented June 5, 1900.
F. B. TORREY.
TROLLEY.
(Application filed Aug. 16, 1899.)
(No Model.)
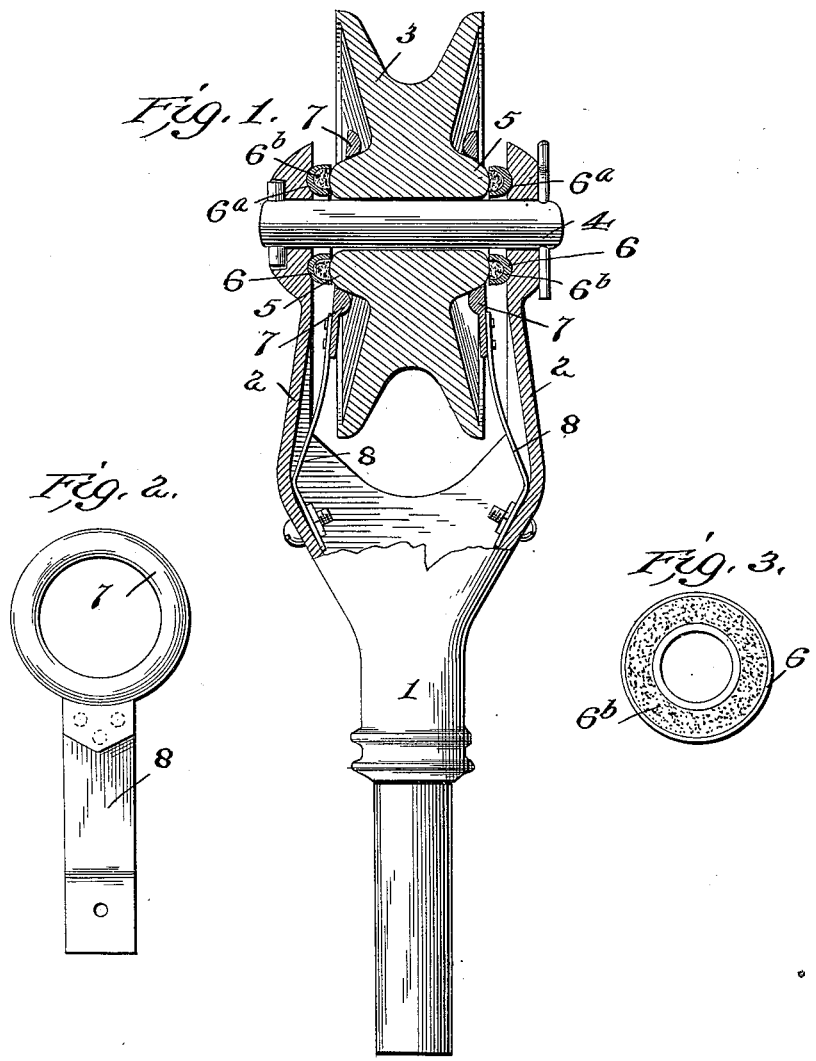
Witnesses
F. L. Middleton
James M. Spear
Inventor
Francis B. Torrey
By his Attorney

UNITED STATES PATENT OFFICE.

FRANCIS B. TORREY, OF BRIDGEPORT, CONNECTICUT.

TROLLEY.

SPECIFICATION forming part of Letters Patent No. 650,878, dated June 5, 1900.

Application filed August 16, 1899. Serial No. 727,421. (No model.)

*To all whom it may concern:*

Be it known that I, FRANCIS B. TORREY, a citizen of the United States, residing at Bridgeport, Connecticut, have invented certain new and useful Improvements in Trolleys, of which the following is a specification.

My said invention relates to improvements in overhead trolleys for electric railways; and the object of the invention is to provide a construction in which the wear upon the trolley wheel and head shall be reduced to a minimum, the wear being taken up by parts which may be readily replaced when worn out.

I have illustrated the invention in the accompanying drawings, in which—

Figure 1 is a central transverse sectional view through the trolley head and wheel. Fig. 2 is a detail view of the brush, and Fig. 3 is a detail view of the bearing-cup.

In the drawings the numeral 1 designates the upper end of the ordinary trolley-pole, terminating in the head or fork 2, within which is journaled the wheel 3, these parts being of the ordinary or any desired construction, except as hereinafter specified. The wheel 3 is journaled upon an axle 4 and is provided on each side with an annular hub extension 5, which coacts with a corresponding end-thrust-receiving and self-lubricating washer 6, interposed between the hub extension and the respective arm of the fork. It will be observed that the end of the hub extension is slightly rounded in cross-section or convex and bears against the lubricating-surface of the washer. This washer is formed with a rounded outer surface adapted to fit an annular recess in the arm of the fork, as indicated at 6ª. On its opposite face the washer is provided with an annular recess, which is filled with a self-lubricating compound, as indicated at 6ᵇ, which provides a self-lubricating surface, against which the end of the hub extension bears and which correspondingly reduces the wear on the said hub extension due to the end thrust on the wheel to the minimum amount.

The brushes which take the current from the wheel are indicated at 7. These are in the shape of rings which, as shown, are large enough to completely encircle the bearing-washers and bear against the hub extensions outside of the circumference of the washers. The rings are mounted on the ends of spring-arms 8, and the surface of each is preferably rounded or convex where it contacts with the hub extension.

From the above description it will be observed that I provide a trolley in which the wear due to the lateral strain upon the trolley-wheel is taken up entirely by the self-lubricating compound within the washer, and this without in the least interfering with the proper passage of the electric current, and, further, that the part which receives the wear—*i. e.*, the washers—may be readily removed to replace the lubricating compound when it has become worn away.

In some cases the washers can be dispensed with and the lubricating material applied directly to the annular recesses in the inner faces of the fork.

Having thus described my invention, what I claim is—

1. An overhead trolley comprising a head or fork, a wheel journaled therein, a self-lubricating bearing in contact on one side with the arms of the fork and on the other side with the hub of the wheel, substantially as described.

2. In combination, the fork, the wheel journaled therein, and the washers interposed between the head and fork and having each an annular recess provided with a filling of self-lubricating material, substantially as described.

3. In combination, the fork, the wheel journaled therein having hub extensions, the washers interposed between the forks and said hub extensions, and the self-lubricating material carried by said washers and contacting with the ends of said hub extensions the washers bearing directly against the forked arms, substantially as described.

4. In combination, the fork, the wheel journaled therein, having hub extensions, the washers interposed between said fork and hub extensions and having annular recesses, and the self-lubricating material filling said recesses and contacting with the hub extensions, substantially as described.

5. In combination, the fork, the wheel journaled therein having hub extensions, self-lubricating washers interposed between the arms of the fork and the wheel, and spring-pressed contact rings or brushes encircling the hub extensions and bearing thereon, substantially as described.

6. In combination, the fork, the wheel journaled therein having hub extensions, self-lubricating washers interposed between the arms of the fork and said hub extensions, and the spring-pressed rings encircling the said extensions and bearing against the periphery of the same, substantially as described.

7. In an end-thrust bearing a washer having an annular recess in the face thereof, and a filling of self-lubricating material located in said recess, substantially as described.

8. An overhead trolley comprising a head or fork and a wheel journaled therein, a contact ring or brush and a self-lubricating compound interposed directly between the wheel and the arms of the fork and independent of the said contact-brush.

In testimony whereof I affix my signature in presence of two witnesses.

FRANCIS B. TORREY.

Witnesses:
  HENRY E. COOPER,
  F. L. MIDDLETON.